United States Patent
Virkler et al.

(10) Patent No.: US 10,107,102 B2
(45) Date of Patent: Oct. 23, 2018

(54) ROTOR DISK ASSEMBLY FOR A GAS TURBINE ENGINE

(71) Applicant: United Technologies Corporation, Hartford, CT (US)

(72) Inventors: Scott D. Virkler, Ellington, CT (US); Daniel E. Kane, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 564 days.

(21) Appl. No.: 14/865,132

(22) Filed: Sep. 25, 2015

(65) Prior Publication Data

US 2016/0160648 A1 Jun. 9, 2016

Related U.S. Application Data

(60) Provisional application No. 62/056,641, filed on Sep. 29, 2014.

(51) Int. Cl.
| | |
|---|---|
| *F01D 5/08* | (2006.01) |
| *F01D 5/14* | (2006.01) |
| *F01D 5/18* | (2006.01) |
| *F01D 5/30* | (2006.01) |

(52) U.S. Cl.
CPC .............. *F01D 5/08* (2013.01); *F01D 5/081* (2013.01); *F01D 5/147* (2013.01); *F01D 5/187* (2013.01); *F01D 5/3007* (2013.01); *F01D 5/3092* (2013.01); *F05D 2220/32* (2013.01); *F05D 2240/24* (2013.01); *F05D 2240/30* (2013.01); *F05D 2240/35* (2013.01); *F05D 2260/202* (2013.01); *F05D 2260/231* (2013.01); *F05D 2260/941* (2013.01); *F05D 2270/112* (2013.01); *Y02T 50/672* (2013.01); *Y02T 50/676* (2013.01)

(58) Field of Classification Search
CPC . F01D 5/08; F01D 5/081; F01D 5/082; F01D 5/147; F01D 5/187; F01D 5/3007; F05D 2220/32
See application file for complete search history.

(56) References Cited

U.S. PATENT DOCUMENTS

| | | | |
|---|---|---|---|
| 4,344,738 A | 8/1982 | Kelly et al. | |
| 4,523,890 A | 6/1985 | Thompson | |
| 5,339,619 A | 8/1994 | Antonellis | |
| 5,429,478 A | 7/1995 | Krizan et al. | |
| 5,735,671 A | 4/1998 | Brauer et al. | |
| 5,836,742 A | 11/1998 | Dierksmeier et al. | |
| 5,941,687 A * | 8/1999 | Tubbs ............... | F01D 5/081 |
| | | | 416/96 R |

(Continued)

FOREIGN PATENT DOCUMENTS

| | | |
|---|---|---|
| EP | 2469024 | 6/2012 |
| WO | 9641068 | 12/1996 |
| WO | 9947792 | 9/1999 |

OTHER PUBLICATIONS

Extended European Search Report for Application No. 151874633 dated Mar. 17, 2016.

*Primary Examiner* — Wood Lee, Jr.
*Assistant Examiner* — Elton Wong
(74) *Attorney, Agent, or Firm* — Carlson, Gaskey & Olds, P.C.

(57) ABSTRACT

A rotor assembly for a gas turbine engine includes a rotor disk. The rotor disk includes a heat barrier feature radially inward of a rotor blade and radially outward of a rotor disk.

13 Claims, 6 Drawing Sheets

(56) References Cited

U.S. PATENT DOCUMENTS

| | | | |
|---|---|---|---|
| 5,957,660 A | 9/1999 | Evans et al. | |
| 6,059,529 A * | 5/2000 | Schiavo | F01D 5/081 416/95 |
| 6,764,282 B2 * | 7/2004 | Suciu | F01D 5/141 416/220 R |
| 6,884,028 B2 | 4/2005 | Brauer et al. | |
| 8,137,072 B2 | 3/2012 | Kim et al. | |
| 8,393,869 B2 * | 3/2013 | Kim | F01D 5/22 416/219 R |
| 8,596,983 B2 | 12/2013 | Kim et al. | |
| 2005/0207892 A1 | 9/2005 | Kanebako et al. | |
| 2011/0076180 A1 * | 3/2011 | Suzuki | C22C 19/057 420/443 |

* cited by examiner

ROTOR DISK ASSEMBLY FOR A GAS TURBINE ENGINE

CROSS-REFERENCE TO RELATED APPLICATION

This application claims priority to U.S. Provisional Application No. 62/056,641 filed on Sep. 29, 2014.

TECHNICAL FIELD

The present disclosure relates generally to a rotor assembly for a gas turbine engine, and more specifically to a rotor assembly including a heat barrier between a rotor blade and a rotor disk.

BACKGROUND

Gas turbine engines, such as those utilized in commercial and military aircraft, include a compressor that compresses air, a combustor that mixes the compressed air with a fuel and ignites the mixture, and a turbine that expands the resultant gases from the combustion. The expansion of the gases through the turbine drives rotors within the turbine (referred to as turbine rotors) to rotate. The turbine rotors are connected to a shaft that is connected to rotors within the compressor (referred to as compressor rotors), thereby driving the compressor rotors to rotate.

In some gas turbine engines, or sections of some gas turbine engines, the rotors are exposed to significant temperatures, and require active cooling. The active cooling is typically provided by passing a coolant, such as engine air, through internal passages in the rotor. Coolant is provided to the rotor blades through a radially inward facing opening in the root of each rotor blade. As the coolant is delivered to the rotor blade, the coolant comes in contact with the rotor disk supporting the rotor blades and causes a cooling effect on the outer periphery of the rotor disk. The cooling effect on the rotor disk is only present on the outer periphery of the rotor disk, and can cause or exacerbate thermal gradients present in the rotor disk.

SUMMARY OF THE INVENTION

In one exemplary embodiment, a rotor assembly for a gas turbine engine includes a rotor disk having at least one radially outward blade retention feature, a rotor blade at least partially received in the blade retention feature, and a heat barrier radially inward of the blade and radially outward of a rotor disk feature.

In another exemplary embodiment of the above described rotor assembly for a gas turbine engine, the heat barrier is a heat shield at least partially received in the blade retention feature.

In another exemplary embodiment of any of the above described rotor assemblies for a gas turbine engine, the at least one radially outward blade retention feature is a fir tree blade retention feature.

Another exemplary embodiment of any of the above described rotor assemblies for a gas turbine engine, further includes a passage defined between a radially inward facing surface of the rotor blade and a radially outward facing surface of the heat shield.

In another exemplary embodiment of any of the above described rotor assemblies for a gas turbine engine, the rotor blade comprises an internal coolant passage.

In another exemplary embodiment of any of the above described rotor assemblies for a gas turbine engine, the heat shield extends a partial axial length of the rotor disk.

In another exemplary embodiment of any of the above described rotor assemblies for a gas turbine engine, the heat shield extends a full axial length of the rotor disk.

In another exemplary embodiment of any of the above described rotor assemblies for a gas turbine engine, the heat shield is integrally formed with the rotor blade.

In another exemplary embodiment of any of the above described rotor assemblies for a gas turbine engine, the heat shield is a distinct component from the rotor blade.

In another exemplary embodiment of any of the above described rotor assemblies for a gas turbine engine, the heat shield includes an axial lip extending axially beyond an axial facing surface of the rotor disk.

In another exemplary embodiment of any of the above described rotor assemblies for a gas turbine engine, the axially extending lip further includes a flange extending radially inward and contacting a secondary feature of the rotor disk, wherein the flange is operable to maintain a position of the heat shield relative to the rotor disk.

In another exemplary embodiment of any of the above described rotor assemblies for a gas turbine engine, the heat shield is constructed of a material selected from nickel superalloys, titanium aluminide, and ceramic matrix composites.

In another exemplary embodiment of any of the above described rotor assemblies for a gas turbine engine, the heat barrier is a coating applied to a radially outward facing surface of the rotor disk.

In another exemplary embodiment of any of the above described rotor assemblies for a gas turbine engine, the coating is applied to at least one axial facing surface immediately adjacent the radially outward facing surface of the rotor disk.

In another exemplary embodiment of any of the above described rotor assemblies for a gas turbine engine, the coating is applied to each axial facing surface immediately adjacent the radially outward facing surface of the rotor disk.

In another exemplary embodiment of any of the above described rotor assemblies for a gas turbine engine, the coating is an insulative coating.

In another exemplary embodiment of any of the above described rotor assemblies for a gas turbine engine, the coating is applied to each exterior facing surface of the rotor disk.

In one example, a gas turbine engine includes a compressor section, a combustor section fluidly connected to the compressor section, a turbine section fluidly connected to the combustor section, a rotor assembly disposed in one of the compressor section and the turbine section, wherein the rotor assembly includes a rotor disk and a plurality of rotor blades protruding radially outward from an outer periphery of the rotor disk, each of the rotor blades including at least one internal cooling passage, a cooling fluid flowpath disposed between a radially inward facing surface of each rotor blade and an outer periphery of the rotor disk, wherein the cooling fluid flowpath is operable to provide a cooling fluid to a corresponding internal cooling passage, and a heat barrier disposed adjacent the outer periphery of the rotor disk, such that the heat barrier prevents cooling fluid in the cooling fluid flowpath from contacting the outer periphery of the rotor disk.

In a further example of the above described gas turbine engine, the heat barrier is a heat shield.

In a further example of any of the above described gas turbine engines, the heat shield is constructed integrally with a corresponding rotor blade.

In a further example of any of the above described gas turbine engines, each of the heat shields and the rotor blades are distinct components.

In a further example of any of the above described gas turbine engines, the heat shield extends a full axial length of the rotor disk.

In a further example of any of the above described gas turbine engines, the heat shield comprises a lip, and wherein the lip extends beyond an axial facing surface of the rotor disk along an axis defined by the gas turbine engine.

In a further example of any of the above described gas turbine engines, the lip further extends radially inward beyond the outer periphery of the rotor disk, such that the lip is a fluid barrier operable to prevent a cooling fluid from passing between the heat shield and the outer periphery of the rotor disk.

A further example of any of the above described gas turbine engines includes a flange extending radially inward from the lip, wherein the flange contacts a radially outward facing surface of the rotor disk, and wherein the flange retains the heat shield in position, relative to the rotor assembly.

An exemplary method for protecting a rotor disk according to any of the above described rotor disks, includes defining a cooling flowpath between a radially inward facing surface of a rotor blade and an outer periphery of a rotor disk, and disposing a heat barrier adjacent the outer periphery of the rotor disk such that a cooling fluid passing through the cooling flowpath is prevented from contacting the outer periphery of the rotor disk.

In a further example of the above exemplary method, disposing a heat barrier adjacent the outer periphery of the rotor disk further comprises disposing an axial lip adjacent an axial facing surface of the rotor disk, thereby preventing a cooling fluid from passing between the heat barrier and the outer periphery of the rotor disk.

In a further example of any of the above exemplary methods, disposing a heat barrier adjacent said outer periphery of said rotor disk comprises disposing a heat shield adjacent said outer periphery of said rotor disk.

In a further example of any of the above exemplary methods, disposing a heat barrier adjacent said outer periphery of said rotor disk comprises disposing a heat resistant coating on at least one surface of the rotor disk.

These and other features of the present invention can be best understood from the following specification and drawings, the following of which is a brief description.

DETAILED DESCRIPTION

Figure 1:
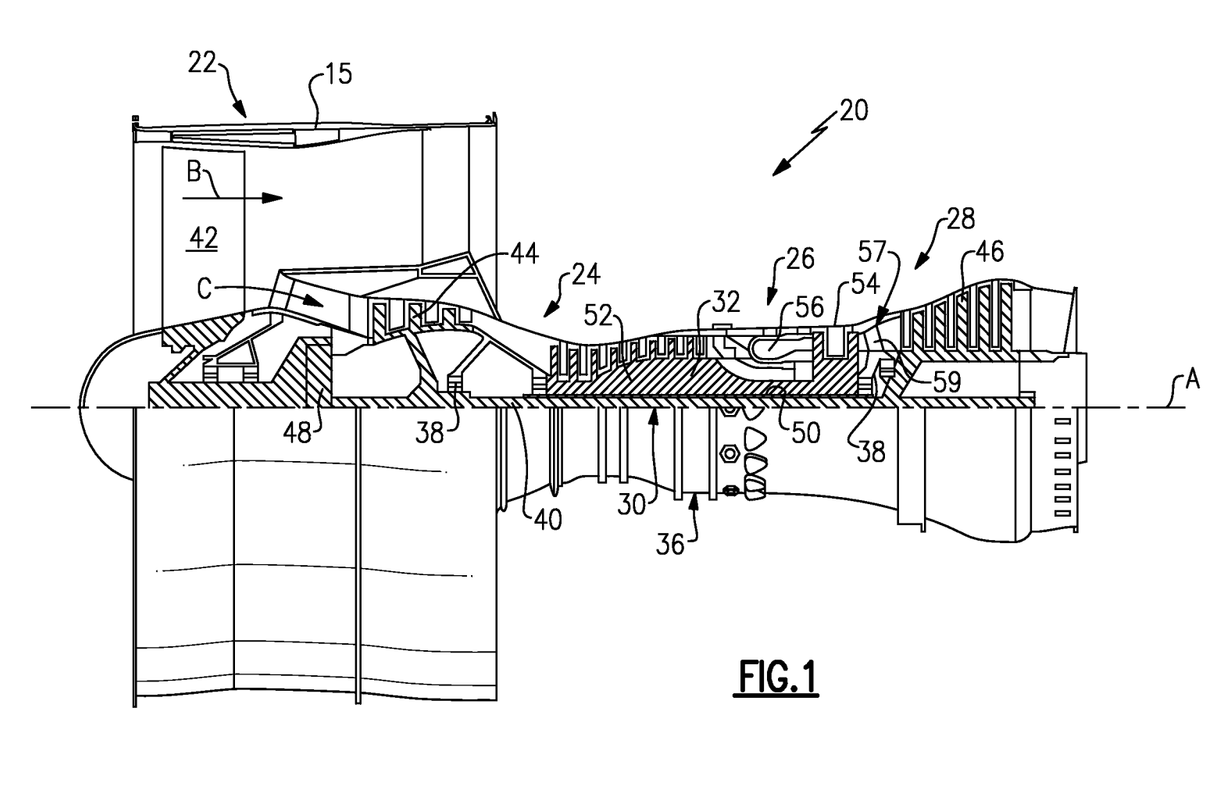
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2:
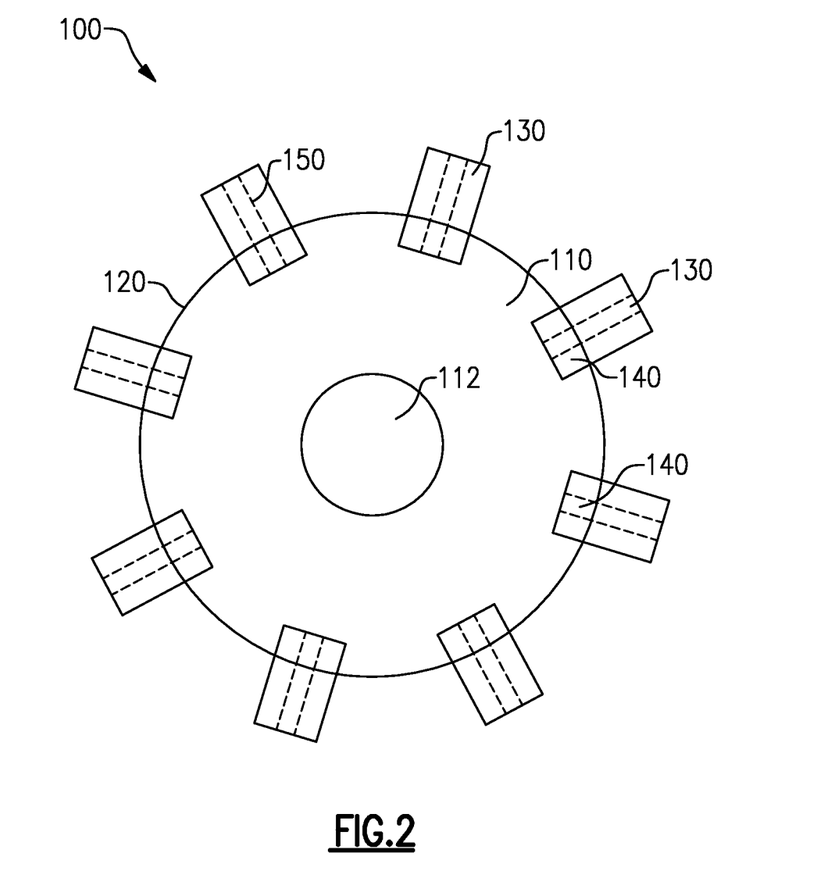
FIG. 2 schematically illustrates a rotor assembly for a gas turbine engine.

With continued reference to FIG. 1, and with like numerals indicating like elements, FIG. 2 schematically illustrates an example rotor assembly 100 for utilization in the above described turbine section 28. The rotor assembly 100 includes a radially inward rotor disk 110 including a center opening 112, commonly referred to as a bore. The center opening is typically utilized to allow for a shaft to pass through the rotor disk 110. Protruding radially outward from a radially outward edge 120 of the rotor disk 110 are multiple rotor blades 130. Each of the rotor blades 130 is interfaced with the rotor disk 110 via an interface feature 140 at a root portion of the rotor blade 130. The interface feature 140 retains the rotor blades 130 in position, relative to the rotor disk 110. In some examples, such as the examples illustrated in FIGS. 3-5, the interface feature 140 is a fir tree connection. In alternative examples, alternative interface features can be utilized to the same effect.

In order to cool the rotor blades 130 during operation of the gas turbine engine 20, a cooling flow is provided to an internal cooling passage 150 in each of the rotor blades 130. The cooling flow is provided to the root portion of the rotor blade 130 and proceeds radially outward through the cooling passage 150 in the rotor blade 130, thereby cooling the rotor blade 130. In some examples, each rotor blade 130 includes multiple cooling passages, a serpentine cooling passage, or both. In other examples, the cooling fluid passing through the cooling passage 150 can be ejected from the rotor blade 130, at a tip of the rotor blade 130, a leading edge of the rotor blade 130, a pressure side of the rotor blade 130, a suction side of the rotor blade 130, the trailing edge of the rotor blade 130 or other locations of the rotor blade 130 depending on the specific engine cooling scheme utilized in the given engine and design of rotor blade 130. In another example, the cooling fluid is engine air provided from another gas turbine engine system.

To provide cooling fluid to the radially interior opening of the cooling passage 150, the cooling fluid is provided axially to an opening defined between the rotor disk 110 and a radially inward facing surface of a corresponding rotor blade 130 using known cooling fluid delivery systems. The axial provision of the cooling fluid causes the cooling fluid to contact, and thereby cool, the radially outward edge, or periphery, of the rotor disk 110 in conventional rotor assemblies. This cooling introduces thermal gradients, or exacerbates existing thermal gradients on the rotor disk 110, and can reduce the expected lifespan of the rotor assembly 100.

Figure 3:
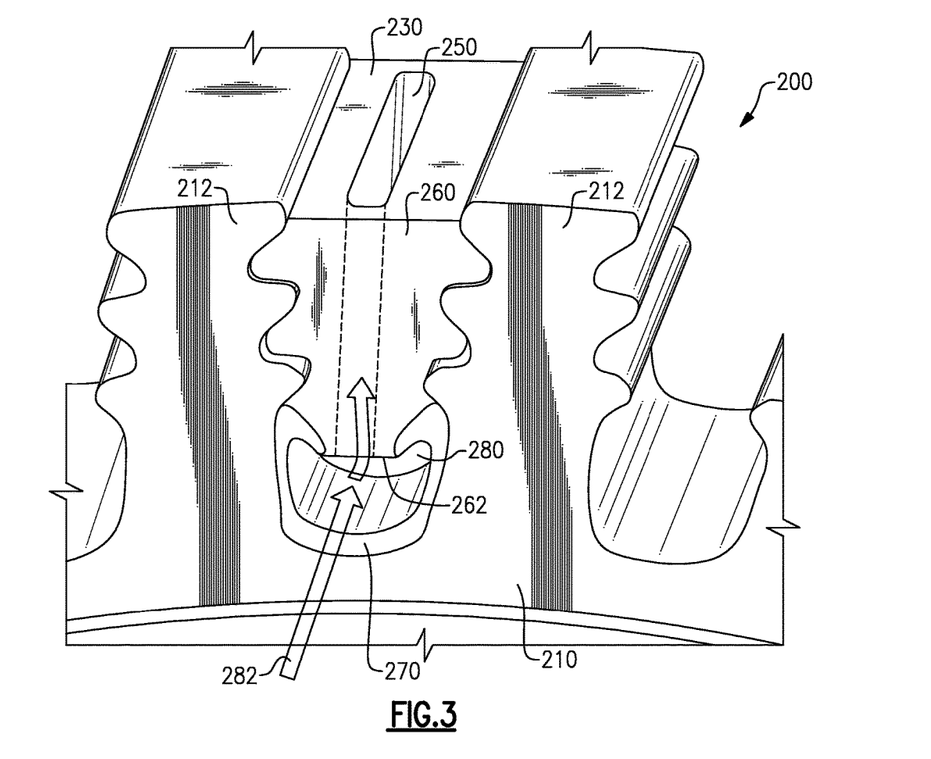
FIG. 3 schematically illustrates an isometric partial view of an example rotor assembly.

With continued reference to FIG. 2, and with like numerals indicating like elements, FIG. 3 schematically illustrates a partial view of a rotor assembly 200 including a heat barrier in the form of a heat shield 270. The heat shield 270 eliminates or reduces the cooling effect. The partial view illustrates a root portion 260 of a rotor blade 230. The root portion 260 is interfaced with the rotor disk 210 via fir tree interface features 212. Defined between a radially inward surface 262 of the root portion 260 and the rotor disk 210 is a passage 280 for providing a cooling fluid to the rotor blade 230. A coolant, such as air, flows axially along a flowpath 282 and enters the passage 280. From the passage 280, the flowpath 282 extends radially outward through an internal passage 250 in the rotor blade 230.

In order to protect the rotor disk 210 from thermal gradients, and to reduce the cooling effect that the coolant in the flowpath 282 has on the rotor disk 210, the heat shield 270 is disposed radially inward of the root portion 260, and defines a remainder of the cooling passage. In some examples, the heat shield 270 extends an entire axial length of the rotor disk 210. In other examples, the heat shield 270 extends a partial axial length of the rotor disk 210. In some examples where the heat shield 270 extends a partial axial length, the heat shield 270 extends at least as far as the axial length of the internal passage 250. In other examples where the heat shield 270 extends a partial length, the axial length of the heat shield 270 can be determined by a cost, weight, and lifetime tradeoff analysis.

In the illustrated example of FIG. 3, the heat shield 270 is a separate component from the rotor blade 230. During assembly of the rotor assembly 200, the heat shield 270 is inserted into the fir tree interface features 212 prior to the rotor blade 230. When the rotor blade 230 is inserted, the root portion 260 of the rotor blade 230 retains the heat shield 270 in position relative to the rotor disk 210. The separate heat shield 270 can be constructed of the same material as the rotor blade 230, or another material having a more desirable heat tolerance. In some examples, depending on where the heat shield 270 is incorporated into an engine, the heat shield could be constructed of nickel superalloys, titanium aluminide, ceramic matrix composites, or any similar materials.

During operation of the gas turbine engine 20, the cooling flowpath 282 passes axially into a cooling passage defined between the heat shield 270 and the root portion 260 of the rotor blade 230. The coolant then proceeds radially outward through the internal passage 250 and cools the rotor blade 230. The heat shield 270 provides a buffer layer, and prevents the cooling flowpath 282 from cooling the rotor disk 210, thereby reducing the magnitude of thermal gradients.

Figure 4:
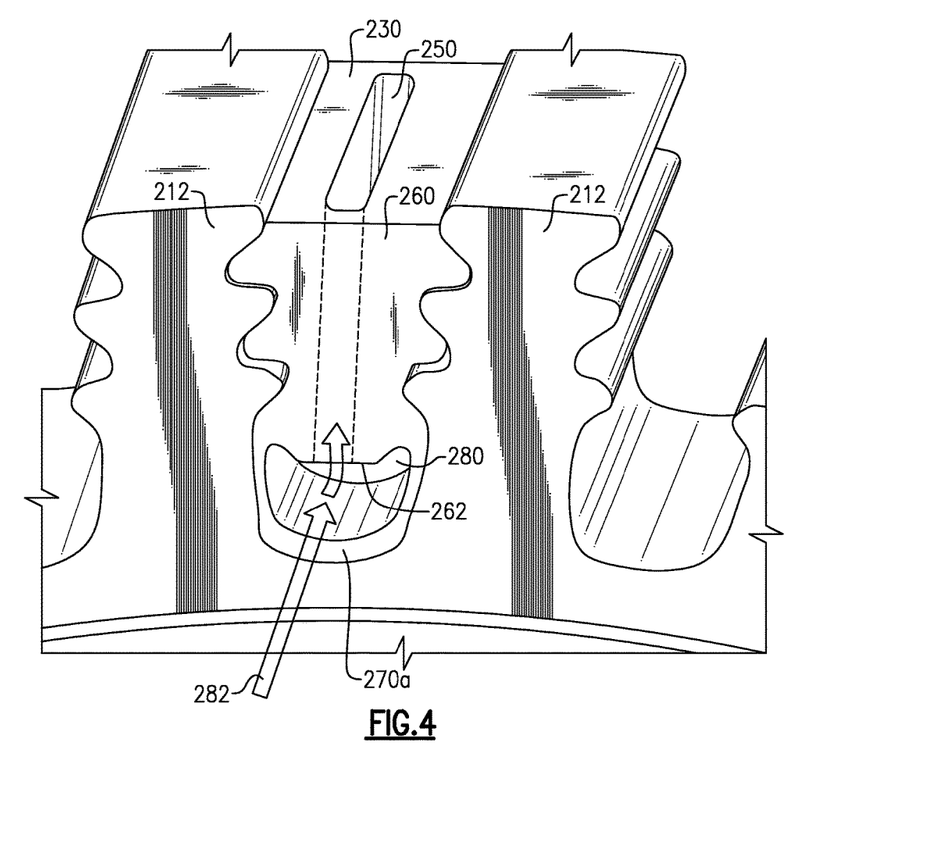
FIG. 4 schematically illustrates an isometric partial view of a first alternate example rotor assembly.

With continued reference to FIG. 3, and with like numerals indicating like elements, FIG. 4 schematically illustrates the partial view of FIG. 3 with a modified heat shield 270*a* as the heat barrier. In the example of FIG. 4, the heat shield 270*a* is constructed integral to the root portion 260 of the rotor blade 230. The integral heat shield 270*a* functions similarly to the heat shield 270 described above with regards to FIG. 3. During assembly of the rotor assembly 200 of FIG. 4, the heat shield 270a and the rotor blade 230 are installed simultaneously due to the integral nature of the heat shield 270a and the rotor blade 230.

With continued reference to both FIGS. 3 and 4, even with the inclusion of a heat shield 270, 270a the axial flow of the flowpath 282 can cause a portion of the cooling fluid to flow between the heat shield 270, 270a and the rotor disk 210. When this occurs, the cooling fluid cools the rotor disk 210 despite the presence of the heat shield 270, 270a and thermal gradients can still be exacerbated. In order to prevent cooling fluid flow from passing between the heat shield 270, 270a and the rotor disk 210, an axial flow prevention feature can be incorporated in the heat shield 270, 270a.

With continued reference to FIGS. 2-4, FIG. 5 schematically illustrates a partial isometric view of a rotor assembly 400. As with the example of FIG. 3, the rotor assembly 400 includes a heat shield 470 that acts as a heat barrier and eliminates or reduces the cooling effect on a rotor disk 410. The partial view illustrates a root portion 460 of a rotor blade 430. The root portion 460 is interfaced with the rotor disk 410 via fir tree interface features 412. Defined between a radially inward surface 462 of the root portion 460 and the rotor disk 410 is a passage 480 for providing a cooling fluid to the rotor blade 430. A coolant, such as air, flows axially along a flowpath 482 and enters the passage 480. From the passage 480, the flowpath 482 extends radially outward through an internal passage 450 in the rotor blade 430.

Figure 5:
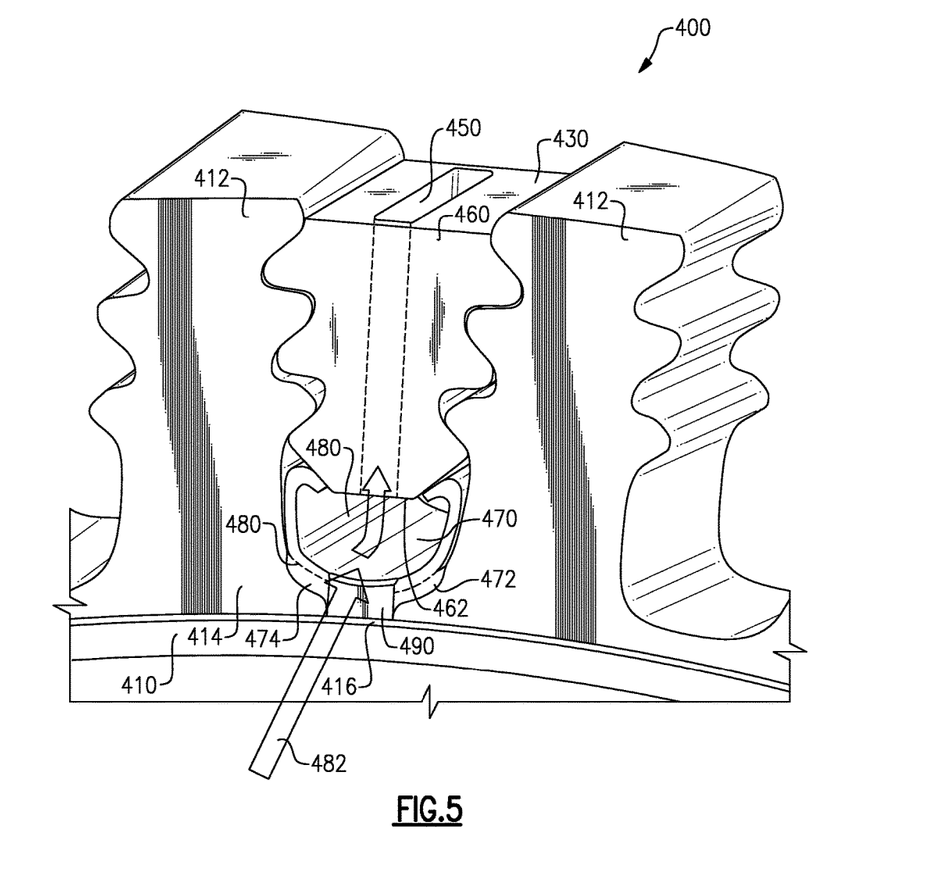
FIG. 5 schematically illustrates an isometric partial view of a second alternate example rotor assembly.

In order to protect the rotor disk 410 from thermal gradients, and to reduce the cooling effect that the coolant in the flowpath 482 has on the rotor disk 410, a heat shield 470 is disposed radially inward of the root portion 460, and defines a remainder of the cooling passage. In some examples, the heat shield 470 extends an entire axial length of the rotor disk 410. In other examples, the heat shield 470 extends a partial axial length of the rotor disk 410. In the examples where the heat shield 470 extends a partial axial length, the heat shield 470 extends at least as far as the axial length of the internal passage 450.

In order to further prevent cooling fluid traveling along the flowpath 482 from passing between the heat shield 470 and the rotor disk 410, the heat shield 470 includes an axial lip 472. The axial lip 472 extends axially beyond an axial facing surface 414 of the rotor disk 410. The axial lip 472 extends radially inward, creating a radial overlap 474 between the rotor disk 410 and the axial lip 472. The radially inner edge 480 of a receiving slot for the heat shield 470 is illustrated via a hidden line. The radial overlap minimizes or eliminates cooling fluid flowing along the axial flowpath 482 that passes between the heat shield 470 and the rotor disk 410. In this way, the cooling of the outer periphery of the rotor disk 410 is further reduced.

The illustrated heat shield 470 of FIG. 5 includes the further feature of a flange 490. The flange 490 extends radially from the axial lip 472 and contacts a secondary feature, such as a radial facing surface 416, of the rotor disk 410. The flange 490 acts as a retention tab, and maintains a position of the heat shield 470 relative to the rotor disk 490. The flange 490 further provides a tighter fit between the heat shield 470, the rotor blade root portion 460 and the retention features 412. The tighter fit reduces vibrations that can occur as the rotor is being brought up to speed or stopped. The vibrations can reduce the expected lifespan of the corresponding rotor blade 430 or the heat shield.

While the example heat shield 470 of FIG. 5 is illustrated as a separate component from the rotor blade 430, one of skill in the art having the benefit of this disclosure will understand that the heat shield 470 can alternatively be constructed integrally to the rotor blade 430 as a single component. Furthermore, while illustrated in conjunction with a fir tree retention feature 412, one of skill in the art, having the benefit of this disclosure will understand that the described heat shield structure and configuration can be utilized with any style retention feature, and is not limited to the illustrated fir tree retention feature.

Figure 6:
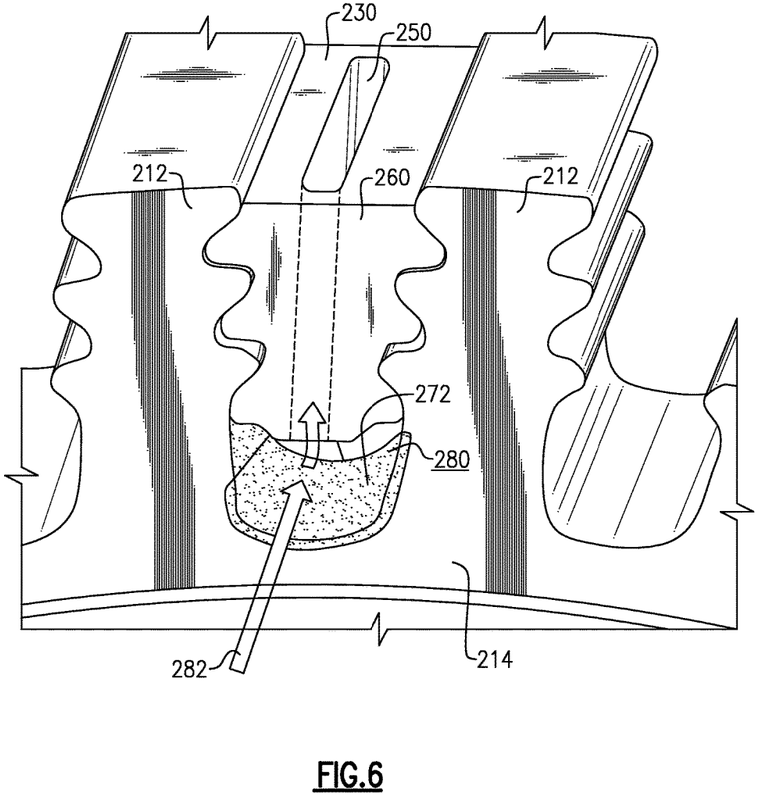
FIG. 6 schematically illustrates an isometric partial view of a third alternate example rotor assembly.

FIG. 6 schematically illustrates a partial view of an alternate rotor assembly 200 including a coating 272 that acts as a heat barrier that eliminates or reduces the cooling effect. The partial view illustrates a root portion 260 of a rotor blade 230. The root portion 260 is interfaced with the rotor disk 210 via fir tree interface features 212. Defined between a radially inward surface 262 of the root portion 260 and the rotor disk 210 is a passage 280 for providing a cooling fluid to the rotor blade 230. A coolant, such as air, flows axially along a flowpath 282 and enters the passage 280. From the passage 280, the flowpath 282 extends radially outward through an internal passage 250 in the rotor blade 230.

In contrast to the examples of FIGS. 3-5, the heat barrier is heat resistant coating 272 applied to the rotor disk surface itself. The heat resistant coating 272 is an insulative coating, and achieves the heat resistance by insulating the rotor disk from the cooling air flowing along the flowpath 282. The coating 272 can be any suitable heat resistant coating, and functions similarly to the above described heat shields. Once applied, the coating 272 becomes integral to the rotor disk 210. In some examples, the coating 272 can be re-applied using a maintenance process, when the coating 272 wears out. In alternative examples, the coating 272 and the rotor disk 210 are replaced simultaneously, and no re-application of the coating 272 is necessary.

In the illustrated example of FIG. 6, the coating 272 is applied to only a portion of the rotor disk 210. The portion of the rotor disk 210 including the coating 272 is the surface of the rotor disk 210 defining the passage 280, as well as a lip portion extending onto the axial facing surface 214 immediately adjacent the passage 280. While the illustrated example of FIG. 6 shows only a single axial facing surface 214, one of skill in the art, having the benefit of this disclosure, will understand that the coating 272 can be extended onto the portion of either the visible axial facing surface 214, the hidden axial facing surface, or both axial facing surface depending on the needs of a specific rotor design.

In yet further examples utilizing the coating 272 as the heat barrier 270, the coating 272 is applied across the entire rotor disk 210. In such examples, the type of coating 272 is selected such that the coating 272 does not interfere with the fit or retention of the rotor blades 230.

In yet further alternative examples, the coating 272 can extend radially outward along the surface of the rotor disk 210 interfacing with the root portion 260 of the rotor blade 230. As with the fully coated example, the specific coating 272 selected depends on the level of heat exposure, and will be selected to ensure that the coating 272 does not interfere with the fit between the root portion 260 of the rotor blade 230 and the rotor disk 210.

With reference to the examples of FIGS. 2-6, the illustrated rotor disks 210, 410 are described as turbine disks for utilization in a turbine section of a gas turbine engine. One of skill in the art, having the benefit of this disclosure, will understand that the disclosed heat barrier and rotor assembly can be utilized in any actively cooled rotor assembly at any stage or section of a gas turbine engine. Furthermore, While described above within the context of a geared turbofan engine, one of skill in the art will understand that the above described rotor assembly can be beneficially utilized in other turbine applications including, but not limited to, direct drive turbine engines, land based turbines, and marine turbines.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A rotor assembly for a gas turbine engine comprising:
   a rotor disk having at least one radially outward blade retention feature;
   a rotor blade at least partially received in said blade retention feature;
   a heat barrier radially inward of the blade and radially outward of a rotor disk feature, wherein the heat barrier is a heat shield at least partially received in said blade retention feature; and
   said heat shield includes an axial lip extending axially beyond an axial facing surface of the rotor disk, the axial lip including a flange extending radially inward and contacting a radially outward facing surface of the rotor disk, wherein the flange is operable to maintain a position of the heat shield relative to the rotor disk.

2. The rotor assembly for a gas turbine engine of claim 1, wherein the at least one radially outward blade retention feature is a fir tree blade retention feature.

3. The rotor assembly for a gas turbine engine of claim 1, further comprising a passage defined between a radially inward facing surface of said rotor blade and a radially outward facing surface of said heat shield.

4. The rotor assembly for a gas turbine engine of claim 1, wherein said rotor blade comprises an internal coolant passage.

5. The rotor assembly for a gas turbine engine of claim 1, wherein said heat shield extends at least a partial axial length of the rotor disk.

6. The rotor assembly for a gas turbine engine of claim 1, wherein the heat shield is constructed of a material selected from nickel superalloys, titanium aluminide, and ceramic matrix composites.

7. The rotor assembly for a gas turbine engine of claim 1, wherein the heat shield is integrally formed with the rotor blade.

8. The rotor assembly for a gas turbine engine of claim 1, wherein the heat shield is a distinct component from said rotor blade.

9. A gas turbine engine comprising:
   a compressor section;
   a combustor section fluidly connected to the compressor section;
   a turbine section fluidly connected to the combustor section;
   a rotor assembly disposed in one of said compressor section and said turbine section, wherein the rotor assembly includes a rotor disk and a plurality of rotor blades protruding radially outward from an outer periphery of said rotor disk;
   each of said rotor blades including at least one internal cooling passage;
   a cooling fluid flowpath disposed between a radially inward facing surface of each rotor blade and an outer periphery of the rotor disk, wherein the cooling fluid flowpath is operable to provide a cooling fluid to a corresponding internal cooling passage; and
   a heat shield disposed adjacent said outer periphery of said rotor disk, such that said heat barrier prevents cooling fluid in said cooling fluid flowpath from contacting said outer periphery of said rotor disk, the heat shield including a lip extending beyond an axial facing surface of the rotor disk along an axis defined by the gas turbine engine and a flange extending radially inward from said lip, wherein said flange contacts a radially outward facing surface of said rotor disk, and wherein said flange retains said heat shield in position, relative to said rotor assembly.

10. The gas turbine engine of claim 9, wherein said lip further extends radially inward beyond said outer periphery of said rotor disk, such that said lip is a fluid barrier operable to prevent a cooling fluid from passing between said heat shield and said outer periphery of said rotor disk.

11. The gas turbine engine of claim 9, wherein said heat shield is constructed integrally with a corresponding rotor blade.

12. The gas turbine engine of claim 9, wherein said heat shield and a corresponding rotor blade are distinct components.

13. A method for protecting a rotor disk comprising:
   defining a cooling flowpath between a radially inward facing surface of a rotor blade and an outer periphery of a rotor disk; and
   disposing a heat shield adjacent said outer periphery of said rotor disk such that a cooling fluid passing through said cooling flowpath is prevented from contacting said outer periphery of said rotor disk by disposing an axial lip adjacent an axial facing surface of said rotor disk, thereby preventing a cooling fluid from passing between said heat shield and said outer periphery of said rotor disk, wherein the axial lip includes a flange extending radially inward from said lip, wherein said flange contacts a radially outward facing surface of said rotor disk, and wherein said flange retains said heat shield in position.

* * * * *